(12) United States Patent
De Castro

(10) Patent No.: US 10,809,734 B2
(45) Date of Patent: Oct. 20, 2020

(54) ROUTE PLANNING IN AN AUTONOMOUS DEVICE

(71) Applicant: Mobile Industrial Robots A/S, Odense SØ (DK)

(72) Inventor: Lourenço Barbosa De Castro, Odense (DK)

(73) Assignee: Mobile Industrial Robots A/S, Odense Soe (DK)

( * ) Notice: Subject to any disclaimer, the term of this patent is extended or adjusted under 35 U.S.C. 154(b) by 76 days.

(21) Appl. No.: 16/351,823

(22) Filed: Mar. 13, 2019

(65) Prior Publication Data

US 2020/0293049 A1    Sep. 17, 2020

(51) Int. Cl.
*G05D 1/02* (2020.01)
*G05D 1/00* (2006.01)

(52) U.S. Cl.
CPC ......... *G05D 1/0217* (2013.01); *G05D 1/0088* (2013.01); *G05D 1/0214* (2013.01); *G05D 1/0231* (2013.01); *G05D 2201/0216* (2013.01)

(58) Field of Classification Search
CPC .. G05D 1/0217; G05D 1/0088; G05D 1/0231; G05D 1/0214; G05D 2201/0216
See application file for complete search history.

(56) References Cited

U.S. PATENT DOCUMENTS

| | | |
|---|---|---|
| 5,983,161 A | 11/1999 | Lemelson et al. |
| 6,493,607 B1 | 12/2002 | Bourne et al. |
| 6,594,844 B2 | 7/2003 | Jones |
| 7,079,943 B2 * | 7/2006 | Flann .................. G01C 21/005 701/423 |
| 7,196,487 B2 | 3/2007 | Jones et al. |
| 8,849,494 B1 * | 9/2014 | Herbach ........... B60W 60/0015 701/24 |
| 8,874,300 B2 | 10/2014 | Allard et al. |
| 9,110,470 B2 | 8/2015 | Karlsson et al. |
| 9,402,151 B2 | 7/2016 | Song et al. |
| 9,415,310 B2 | 8/2016 | Martini |
| 9,440,354 B2 | 9/2016 | Gutmann et al. |
| 9,495,874 B1 * | 11/2016 | Zhu ....................... B60W 30/09 |
| 9,606,544 B2 | 3/2017 | Gariepy et al. |

(Continued)

FOREIGN PATENT DOCUMENTS

| | | |
|---|---|---|
| CA | 2416382 C | 2/2006 |
| EP | 2108563 A2 | 10/2009 |

(Continued)

OTHER PUBLICATIONS

Blizzard, Classic games, Warcraft: Orcs & Humans (1994). [Online]. Available: http://us.blizzard.com/en-us/games/legacy. [Last accessed Dec. 26, 2017].

(Continued)

*Primary Examiner* — Richard M Camby
(74) *Attorney, Agent, or Firm* — Burns & Levinson LLP

(57) ABSTRACT

An example system includes a computing system configured to identify an event in an area between a first location and a second location and to adjust, based on the event, content of a cost map containing a representation of one or more routes between the first location and the second location. The system also includes an autonomous device configured to move between the first location and the second location based on the cost map.

45 Claims, 11 Drawing Sheets

(56) References Cited

U.S. PATENT DOCUMENTS

| | | | |
|---|---|---|---|
| 9,663,025 B2 | 5/2017 | Drexler et al. | |
| 9,844,879 B1 | 12/2017 | Cousins et al. | |
| 9,891,630 B2 | 2/2018 | Gariepy et al. | |
| 9,918,605 B2 | 3/2018 | Wolfe et al. | |
| 9,964,952 B1* | 5/2018 | Costa | G05D 1/0289 |
| 10,028,632 B2 | 7/2018 | Britain et al. | |
| 10,220,857 B2* | 3/2019 | Jones | B60W 10/20 |
| 10,416,677 B2* | 9/2019 | Dean | G05D 1/0214 |
| 2004/0013295 A1 | 1/2004 | Sabe et al. | |
| 2004/0093650 A1 | 5/2004 | Martins et al. | |
| 2004/0158354 A1 | 8/2004 | Lee et al. | |
| 2005/0216182 A1 | 9/2005 | Hussain et al. | |
| 2006/0042842 A1 | 3/2006 | Berg et al. | |
| 2009/0125225 A1 | 5/2009 | Hussain et al. | |
| 2011/0166737 A1 | 7/2011 | Tanaka et al. | |
| 2014/0110183 A1 | 4/2014 | Rudakevych et al. | |
| 2014/0129027 A1 | 5/2014 | Schnittman | |
| 2015/0345971 A1 | 12/2015 | Meuleau et al. | |
| 2017/0031366 A1 | 2/2017 | Shamlian et al. | |
| 2017/0038776 A1 | 2/2017 | Gariepy et al. | |
| 2017/0080850 A1 | 3/2017 | Drexler et al. | |
| 2017/0197643 A1 | 7/2017 | Gariepy et al. | |
| 2017/0232885 A1 | 8/2017 | Drexler et al. | |
| 2017/0276501 A1 | 9/2017 | Wise et al. | |
| 2018/0156622 A1 | 6/2018 | Mouthaan et al. | |
| 2018/0261023 A1 | 9/2018 | Blayvas et al. | |
| 2018/0281191 A1 | 10/2018 | Sinyayskiy et al. | |
| 2018/0333850 A1 | 11/2018 | Komlosi | |
| 2018/0364724 A1 | 12/2018 | Ibarz Gabardos et al. | |
| 2019/0051198 A1 | 2/2019 | Nimmagadda et al. | |
| 2020/0019175 A1* | 1/2020 | Dean | G06N 20/00 |

FOREIGN PATENT DOCUMENTS

| | | |
|---|---|---|
| GB | 2436712 A | 10/2007 |
| WO | WO-2006/089071 A2 | 8/2006 |
| WO | WO-2015/047195 A1 | 4/2015 |
| WO | WO-2016/057140 A1 | 4/2016 |
| WO | WO-2016/165721 A1 | 10/2016 |
| WO | 2017214581 A1 | 12/2017 |

OTHER PUBLICATIONS

Borenstein, J. et al., Mobile Robots Positioning: Sensors and Techniques, Journal of Robotic Systems, 14(4): 231-249 (1997).

Burgard, W. and Bennewitz, M. et al, Introduction to Mobile Robotics, Robot Motion Planning, University of Freiburg, 151 pages (Jul. 2011).

Dixon, J., and Henlich, O., Mobile Robot Navigation, Final Report, Imperial College, London, 27 pages (Jun. 10, 1997). [Online]. Available: https://www.doc.ic.ac.uk/~nd/surprise_97/journal/vol4/jmd/ . [Accessed Jun. 22, 2017].

Dos Gamers Archive, Warcraft II: Tides of Darkness, 1 page (1995). [Retrieved Online Aug. 15, 2018]. Available: http://image.dosgamesarchive.com/screenshots/war2_06.png.

Edwards, T. and Sorme, J., A Comparison of Path Planning Algorithms for Robotic Vacuum Cleaners, Degree Project in Technology, KTH Royal Institute of Technology, School of Electrical Engineering and Computer Science, Stockholm, Sweden, 37 pages (2018).

European Search Report for EP16779651.5, 7 pages (dated Nov. 30, 2018).

Expomondo, EXPO 2000, Themenpark & Außengelände, Deutschland, Holtmann International, (2000). [Online]. Available: http://expomondo.it/expo.html.

ferzkopp.net, 2000. [Retrieved Online Aug. 15, 2018]. Available: http://www.ferzkopp.net/MediaAndArt/Expo2000/Softwaremodule.gif.

Goel, P. et al., Robot Localization Using Relative and Absolute Position Estimates, In Proc. Int. Conf. Intelligent Robots and Systems, IROS '99, 7 pages (1999).

International Search Report for PCT/DK2016/050104, 8 pages (dated Jun. 27, 2016).

Mobile Industrial Robots, MiRFleet, Reference Guide, v.1.0, 32 pages (Jan. 2017).

Nedelea, A., Hyundai's Future Augmented Reality Looks Pretty Cool, 6 pages (Jan. 1, 2015). [Retrieved Online Aug. 15, 2018]. Available: https://www.carscoops.com/2015/01/hyundais-future-augmented-reality-looks/.

Paya, L. et al., A State-of-the-Art Review on Mapping and Localization of Mobile Robots Using Omnidirectional Vision Sensors, Journal of Sensors, vol. 2017, Article ID 3497650, 20 pages (Published Apr. 24, 2017). URL: https://www.hindawi.com/journals/js/2017/3497650/ [Retrieved Nov. 19, 2018].

Roger Russell, "roger-russell.com," 2004. [Online]. Available: https://web.archive.org/web/20050404140115/http://www.roger-russell.com/project/project.htm. [Retrieved Aug. 20, 2018].

Shenton, Collectable Clocks, Illustration 306, Projection Clock/Night Clock (1909). [Online]. Available: https://web.archive.org/web/20041012014240/http://www.mueller-maerki.com:80/hniteclk.html. [Retrieved Aug. 20, 2018].

Toussaint, M., Robotics, Path Planning, University of Stuttgart, 76 pages (Winter 2014-2015).

United States Patent and Trademark Office, U.S. Appl. No. 14/883,698 Notice of Allowance and Fee(s) due, 7 pages (dated Nov. 29, 2011).

Written Opinion for PCT/DK2016/050104, 10 pages (dated Jun. 27, 2016).

Zentrum für Kunst und Medientechnologie (ZKM), Knowledge, Information, Communication Swarming with robots, EXPO 2000 Hannover GmbH (2000). [Online]. Available: http://site.expo2000.de/expo2000/englisch/themenpark/frame_wissen_e.html.

MIR Fleet Reference Guide. Mobile Industrial Robots A/S. Odense, SØ. (Jan. 2017). V. 1.0, (pp. 1-30). 32 pages.

MIR 500 User Guide. Mobile industrial Robots A/S. Odense, SØ. (Sep. 2019). V. 1.3, (pp. 1-100). 100 pages.

MIR 100 User Guide. Mobile industrial Robots A/S. Odense, SØ. (Aug. 2018). V. 1.1, (pp. 1-42). 44 pages.

MIR 100 User Guide. Mobile Industrial Robots A/S. Odense, SØ, (Nov. 2017). V. 1.0, (pp. 1-37), 39 pages.

International Search Report for PCT/EP2020/055034 (6 Pages), dated May 27, 2020.

Written Search Opinion for PCT/EP2020/055034 (12 Pages) dated May 27, 2020.

\* cited by examiner

ROUTE PLANNING IN AN AUTONOMOUS DEVICE

TECHNICAL FIELD

This specification relates generally to an autonomous device configured to perform route planning.

BACKGROUND

Autonomous devices, such as mobile robots, are configured to travel within a confined space, such as a warehouse. For example, an autonomous device may determine its location within the space and use that location to control its future movements along a route. Route planning in an autonomous device may include selecting a route between two or more locations within the space.

SUMMARY

An example system includes a computing system configured to identify an event in an area between a first location and a second location and to adjust, based on the event, content of a cost map containing a representation of one or more routes between the first location and the second location. The system also includes an autonomous device configured to move between the first location and the second location based on the cost map. The system may include one or more of the following features, either alone or in combination.

The system may include one or more detectors configured to detect the event and to transmit data to the computing system based on the event, The computing system may be configured to identify the event based on the data.

The one or more detectors may include one or more cameras located in the area. The system may include a detection system comprising the one or more detectors. The detection system may include cameras that are static and that are along the one or more routes between the first location and the second location. The detection system may include cameras that are dynamic and that are along the one or more routes between the first location and the second location. The one or more detectors may include cameras that are located on the autonomous device. The one or more detectors may include cameras that are located in the area and one or more cameras that are located on the autonomous device or on another autonomous device.

The event may include an obstacle blocking one of the one or more routes at least partly. The event may be temporary. Identifying the event may include predicting the event. The computing system may be configured to predict a further development of the event as part of a process for identifying the event. The computing system may be configured to adjust the content of the cost map based on the further development of the event.

The computing system may be separate from the autonomous device. The computing system may be located on the autonomous device. The computing system may be distributed, with at least part of the computing system being located on the autonomous device and at least part of the computing system being separate from the autonomous device.

Adjusting the content of the cost map may include adding a weight to a cost of a route among the one or more routes, with a greater weight being indicative of a less desirable route. The one or more routes may include at least two routes that have different costs. The computing system may be configured to select one of the at least two routes having a least cost for the autonomous device. The computing system may be configured to select one of the at least two routes for the autonomous device based on a cost of the one of the at least two routes. The cost may be based at least in part on one or more of the following: a length of the one of the at least two routes, an inclination of the one of the at least two routes, a material associated with the one of the at least two routes, or a width of the one of the at least two routes. Greater costs may be assigned to longer routes.

A route among the one or more routes may include a segment along a path between the first location and the second location. The segment may contain an entirety of the path between two locations on the path. A route among the one or more routes may include a zone along a path between the first location and the second location. The zone may contain less than an entirety of the path between two locations on the path.

The system may include detectors on a route among the one or more routes that are not movable along a length of the route. The detectors on the route may leave at least some areas not covered by the detectors. The system may include one or more detectors on the autonomous device or on another autonomous device. The one or more detectors are configured to perform detection in the at least some areas not covered by the detectors on the route. At least one of the detectors on the route or the one or more detectors are configured to send data to the computing system representing the event.

The system may include one or more detectors on the autonomous device configured to send data based on the event to the computing system. The computing system may be configured to adjust the content of the cost map based on the data to produce an adjusted cost map. The computing system may be configured to transmit the adjusted cost map to one or more other autonomous devices.

The event may include an object blocking the route. Identifying the event may include predicting that the object that will block the route based on one or more attributes of the object. The one or more attributes of the object may include a size of the object, a color of the object, or a shape of the object. The one or attributes of the object may include one or more of a speed of movement of the object, a direction of movement of the object, or a location of the object.

The system may include detectors on a route among the one or more routes that are not movable along a length of the route. The detectors on the route may leave areas not covered by the detectors. Predicting the event may include predicting whether an object will at least partly block at least one of the areas not covered by the detectors.

An example method includes detecting an event in a route between a first location and a second location, identifying the event based on data representing the event, adjusting content of a cost map containing a representation of the route based on identification of the event, making the cost map accessible to an autonomous device that is capable of traversing the route, and controlling the autonomous device to traverse the route based on the cost map. The method may include one or more of the following features, either alone or in combination.

Adjusting the content of the cost map may include adding a cost to the route, with a greater cost being indicative of a less desirable route. Routes, including the route, between the first location and the second location on the cost map may have different costs. Controlling the autonomous device to traverse the route may include selecting the route based on a cost of the route.

The event may be a temporary event. Detecting the event may be performed using detectors on the route that are not movable along a length of the route. The detectors on the route may leave at least some areas not covered by the detectors. Detecting the event may be performed using one or more detectors on the autonomous device configured to perform detection in the at least some areas not covered by the detectors.

The route may include a segment along a path between the first location and the second location. The segment may contain an entirety of the path between two locations on the path. The route may include a zone along a path between the first location and the second location. The zone may contain less than an entirety of the path between two locations on the path.

Detecting the event may be performed by one or more detectors on the autonomous device. Making the cost map accessible may include distributing the cost map to one or more autonomous device including the autonomous device. Detecting the event may be performed by one or more cameras located along the route.

Identifying the event may be performed by a computing system that is separate from the autonomous device. Identifying the event may be performed by a computing system that is part of the autonomous device. Identifying the event may be performed by a computing system that is partly on the autonomous device and partly separate from the computing device. Identifying the event may include predicting a further development of the event. The event may include an object blocking the route. Identifying the event may include predicting that the object that will block the route based on one or more attributes of the object.

The one or more attributes of the object may include a size of the object, a color of the object, or a shape of the object. The one or attributes of the object may include one or more of a speed of movement of the object, a direction of movement of the object, and a location of the object.

There may be detectors on the route that are not movable along a length of the route. The detectors on the route may leave areas not covered by the detectors. Predicting the event may include determining whether an object will at least partly block at least one of the areas not covered by the detectors.

Any two or more of the features described in this specification, including in this summary section, can be combined to form implementations not specifically described herein.

The systems and processes described herein, or portions thereof, can be controlled by a computer program product that includes instructions that are stored on one or more non-transitory machine-readable storage media, and that are executable on one or more processing devices to control (e.g., coordinate) the operations described herein. The systems and processes described herein, or portions thereof, can be implemented as an apparatus or method. The systems and processes described herein can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
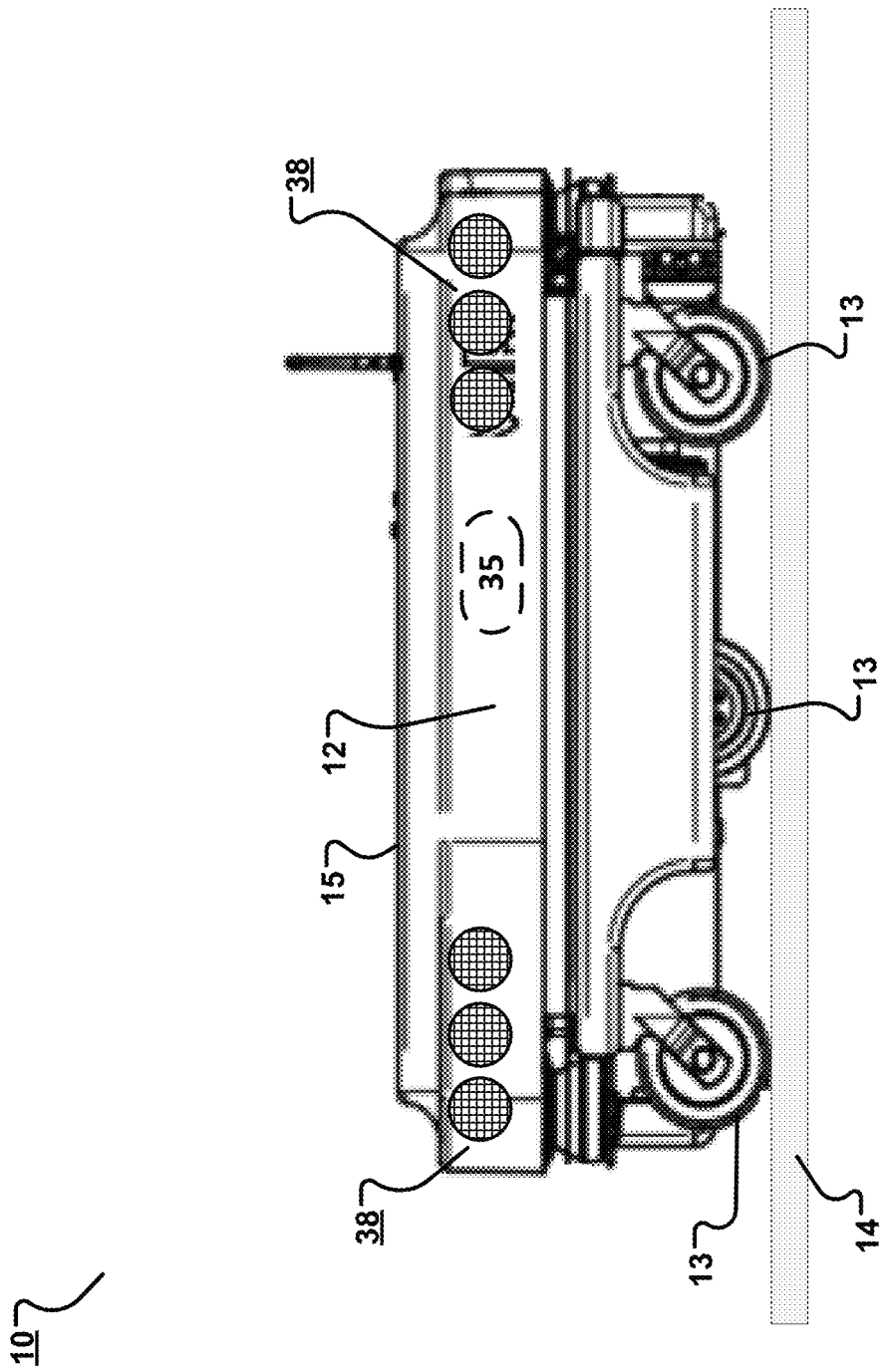
FIG. 1 is a side view of an example autonomous robot.

Described herein are example systems for implementing route planning for one or more autonomous devices operating within a confined space. An example system includes one or more autonomous devices having one or more receivers for receiving route planning updates via a control system. The control system may control the autonomous devices in order to enable the autonomous devices to choose a route through a dynamically changing environment. These route planning updates may be obtained from distributed cameras or other detectors that provide information about local visual elements that may be used to update a cost map dynamically.

Also described herein are examples of autonomous devices, such as a mobile robot, that are configured to move within a space, such as a warehouse or factory. An example autonomous device (or "device") is configured to move along a surface, such as the floor of a warehouse. In this example, the device includes a body for supporting the weight of an object and wheels on the body to enable the body to traverse the surface. The device is also associated with a control system that is configured—for example, programmed—to select a route along which the device is to travel. For example, the control system may have access to a cost map that contains a representation of one or more possible routes between a first location and a second location. The control system may determine based, for example, on costs associated with the different routes how best to move the device from the first location to the second location. For example, if one of the routes is completely or partially blocked, a cost of that route may be increased on the cost map. When determining how to move the device between the first and second locations, the control system may compare costs associated with various routes. In this example, the cost of a shorter route that is completely or partially blocked may be greater than the cost of a longer route that is not blocked. In this example, a greater cost, as expressed by weight, is indicative of a less desirable route.

Accordingly, the control system may select the longer route having a lower cost and control the device to move along that longer route to its destination.

The control system may adjust the cost map by changing—for example, adding or removing—weights or other metrics on the routes. Information for adjusting the cost map may be obtained from detectors located on the device itself, on other devices that have traveled or are traveling within a same area as the device, and/or on structures such as walls, floors, or ceilings within the area. Thus, some detectors may be dynamic and movable within the area and some detectors may be static and not movable within the area. In some implementations, detectors mounted to structures may be mobile in the sense that they may pivot, rotate, or move translationally relative to those structures while mounted. The detectors may detect an event, such as an object or obstacle currently in the path of the device or an object or obstacle moving into the path of the device. The event may be temporary in the sense that it is not a permanent state or condition. The control system may react to this event by adjusting the cost map of a route that currently contains or that will contain the object or obstacle.

An example autonomous device includes an on-board computing system and memory storing a map, such as a cost map, of a confined space. The on-board computing system may be configured—for example, programmed—to receive driving instructions and to plan a route between two or more points in the map. The map includes information representing possible routes through the confined space and may also contain information about preferred routes and driving and dimensional restrictions on some routes. This type of route planning is referred to as global planning.

The autonomous device may also include one or more detectors for continuously detecting and calculating distances between the devices and static or dynamic objects in a vicinity of the device. This is done in order to avoid collision and to guide the device safely around or between detected objects along a route. While the autonomous device is moving along a route, the on-board computing system may continuously receive input from the detectors. If an obstacle is blocking the trajectory of the autonomous device, the on-board computing system is configured to plan a path around the obstacle. If an obstacle is predicted to block the trajectory of the autonomous device, the on-board computing system is configured to plan a path around the obstacle. These operations are referred to as local planning.

An example of an autonomous device is autonomous robot 10 of FIG. 1. In this example, autonomous robot 10 is a mobile robot and is referred to simply as "robot". Robot 10 includes a body 12 having wheels 13 to enable robot 10 to travel across a surface 14, such as the floor of a warehouse, a factory, or other terrain. Robot 10 includes a support area 15 configured to support the weight of an object. In this example, robot 10 may be controlled to transport the object from one location to another location. Robot 10 includes various detectors—also referred to as sensors—for use in detecting objects in the vicinity of the robot. In this regard, an object or obstacle may be an inanimate or animate subject, which are both referred to as objects.

In this example, robot 10 includes two types of visual detectors: a three-dimensional (3D) camera and a light detection and ranging (LIDAR) scanner. However, the robot is not limited to this configuration or to using these specific detectors. For example, the robot may include a single detector or a single type of detector. For example, the robot may include more than two types of detectors.

Figure 2:
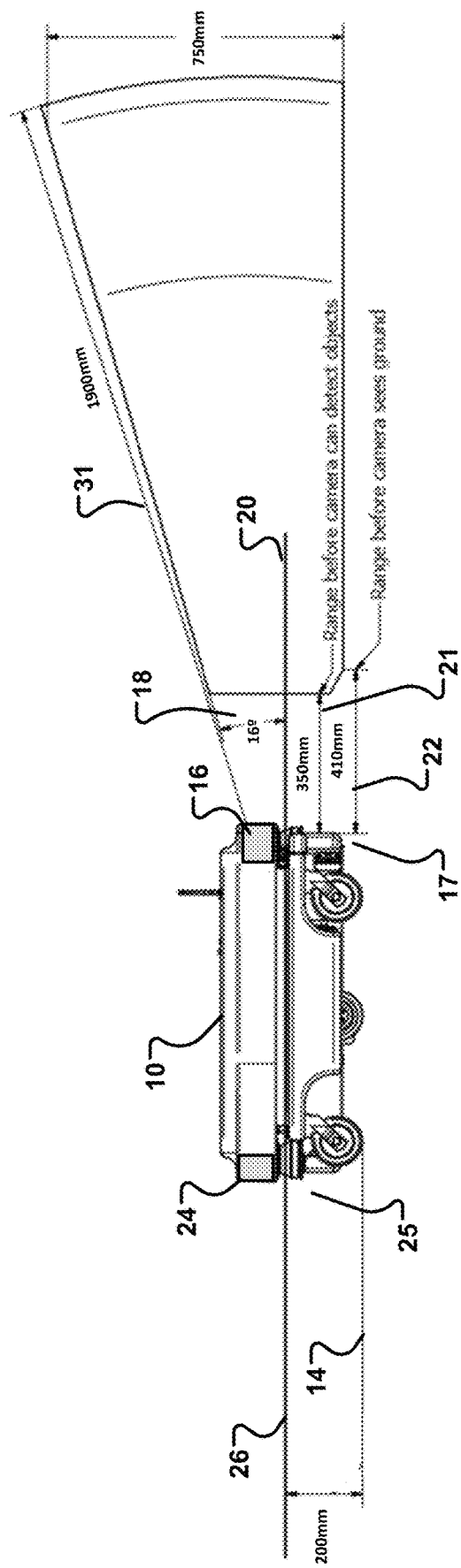
FIG. 2 is a side view of the example autonomous robot, which shows ranges of detectors included on the robot.

Referring to FIG. 2, robot 10 includes 3D camera 16 at a front 17 of the robot. In this example, the front of the robot faces the direction of travel of the robot. The back of the robot faces terrain that the robot has already traversed. In this example, 3D camera 16 has a FOV 18 of 16° off of horizontal plane 20. The placement of 3D camera 16 is such that there is about a 350 millimeter (mm) range 21 before the 3D camera can detect an object proximate to the robot, and about a 410 mm range 22 before the object can detect the surface 14 on which it is traveling. In this example, the 3D camera has a sensing range 31 of about 1900 mm and can see about 750 mm above surface 14. Robot 10 also includes a LIDAR scanner 24 at its back 25. In this example, the LIDAR scanner is positioned at a back corner of the robot. The LIDAR scanner is configured to detect objects within a sensing plane 26. In this example, the sensing plane is about 200 mm above surface 14. A similar LIDAR scanner is included at the diagonally opposite front corner of the robot, which has the same scanning range and limitations.

Figure 3:
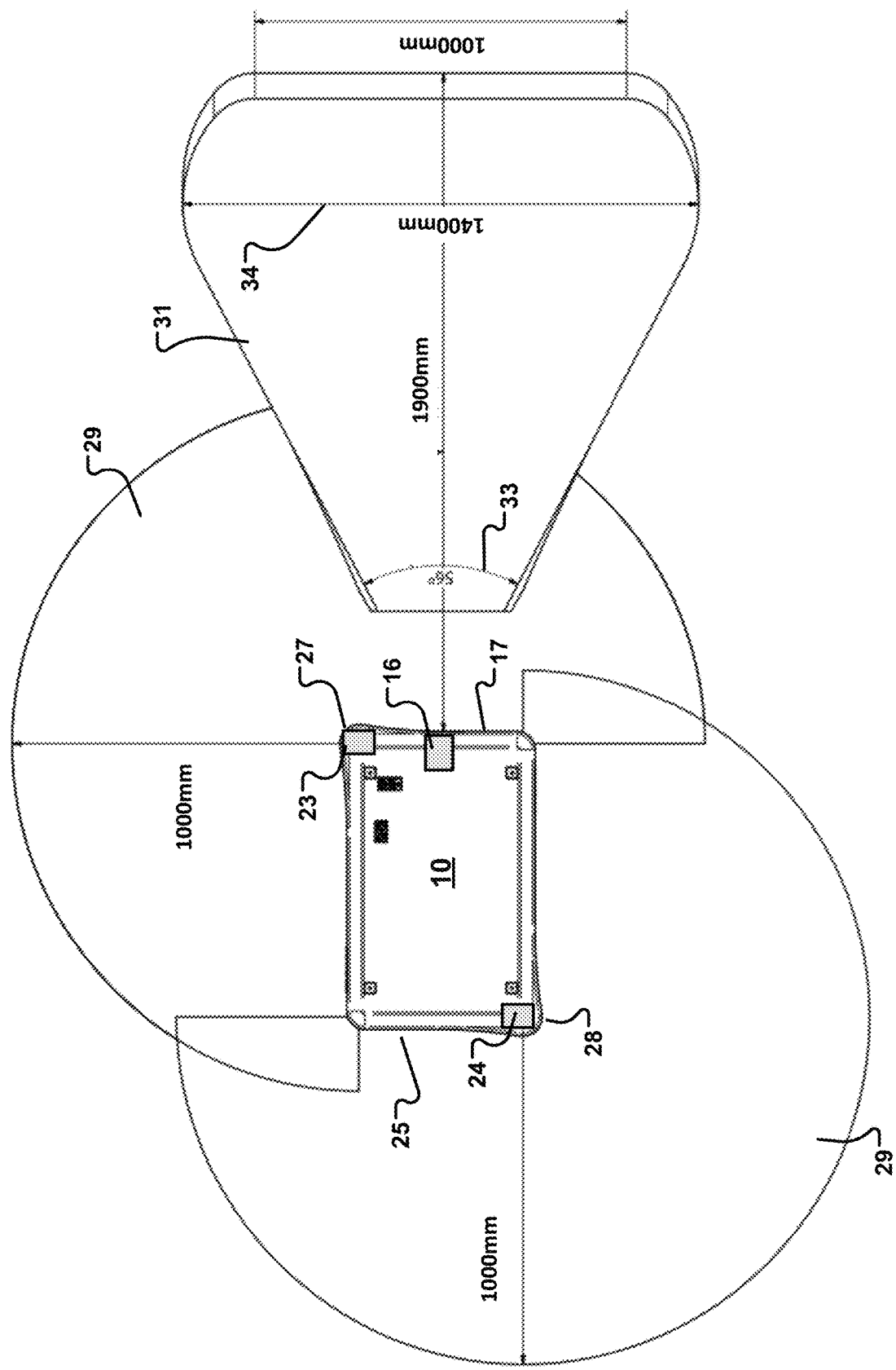
FIG. 3 is a top view of the example autonomous robot, which shows ranges of the detectors included on the robot.

FIG. 3 is a top view of robot 10. LIDAR scanners 24 and 23 are located at back corner 28 and at front corner 27, respectively. In this example, each LIDAR scanner has a scanning range 29 of about 1000 mm over an arc of about 270°. In some implementations, each LIDAR scanner may have a scanning range of about 12,000 mm over an arc of about 270°. In this example, a range 31 of 3D camera 16 is about 1900 mm over an arc 33 of about 56°. However, after a plane 34, the field of view of 3D camera 16 decreases from about 1400 mm to about 1100 mm at the maximum range of the 3D camera. In some implementations, short-range detectors are incorporated into the robot to detect in the areas that cannot be sensed by long-range detectors. The short-range detectors 38 (FIG. 1) may be arranged at corners of the robot or around a circumference of the robot. Examples of short-range detectors include, but are not limited to, time-of-flight (ToF) laser-ranging modules, an example of which is the VL53L0X manufactured by STMicroelectronics®, and infrared sensors.

The LIDAR scanner, the 3D camera, and/or any detectors constitute a vision system for the robot. In some implementations, the vision system may include different detectors or combinations of detectors. For example, there may be a 3D or other camera at the back of the robot and a LIDAR sensor at the front of the robot in addition to those already present in FIG. 1. Visual data obtained by the vision system may be used to adjust a cost map of a space to be traversed by the robot. As noted, each mobile robot traveling through the space may include such a vision system and may contribute data, such as visual data, for use in adjusting the cost map of the space. As also noted, detectors such as 3D cameras, LIDAR scanners, and the like may be mounted in areas that the mobile device is to travel. For example, the detectors may be mounted on walls, floors, ceilings, or other structures within an area and throughout routes that the robot may take between two or more locations. Ideally, the detectors cover all parts of an area such that there are no blind spots. A blind spot may include an area that is not viewable by a detector, such as a mounted detector. In some cases, however, there may be blind spots, which are addressed below. These detectors also contribute data, such as visual data, for use in adjusting the cost map of the space.

In some implementations, the control system stores the cost map of the space in computer memory. The cost map may be located on each robot or at any location that is accessible to the control system and to the robot. The map may also include locations of landmarks, such as columns, corners, windows, poles, and other distinguishable features of the space that act as references for the robot. The map also may also include measurements indicating the size of the space, measurements indicating the size and locations of the landmarks, measurements indicating distances between landmarks, and coordinate information identifying where the landmarks are located in the space.

The cost map includes representations of one or more routes along which the robot may travel from a first location ("start") such as its current location to a second location ("goal") such as its destination. Each route may have one or more associated costs stored on the map. In an example, the cost represents a level of difficulty associated with traversing the route. In an example, a greater cost may be indicative of a greater level of difficulty in traversing the route. In another example, a lower cost may be indicative of a greater level of difficulty in traversing the route.

The cost may be based on a variety of factors, such as the length of the route, the incline of the route, and the material included on the surface of the route. The cost of each route may also be based on information from one or more detectors such as those described previously. For example, information from detectors on the device, on other devices, or mounted to structures may be used to adjust the cost map. Adjusting the cost may include, for example, adding a weight to one or more of the routes to increase its cost relative to one or more of the other routes on the cost map. Adding the weight may include increasing an existing weight along all or part of the route. The weights may be based on the presence of an object such as an object completely or partially blocking a route. In an example, the cost of a route may be increased more in the case of a total blockage than in the case of a partial blockage.

Figure 4:
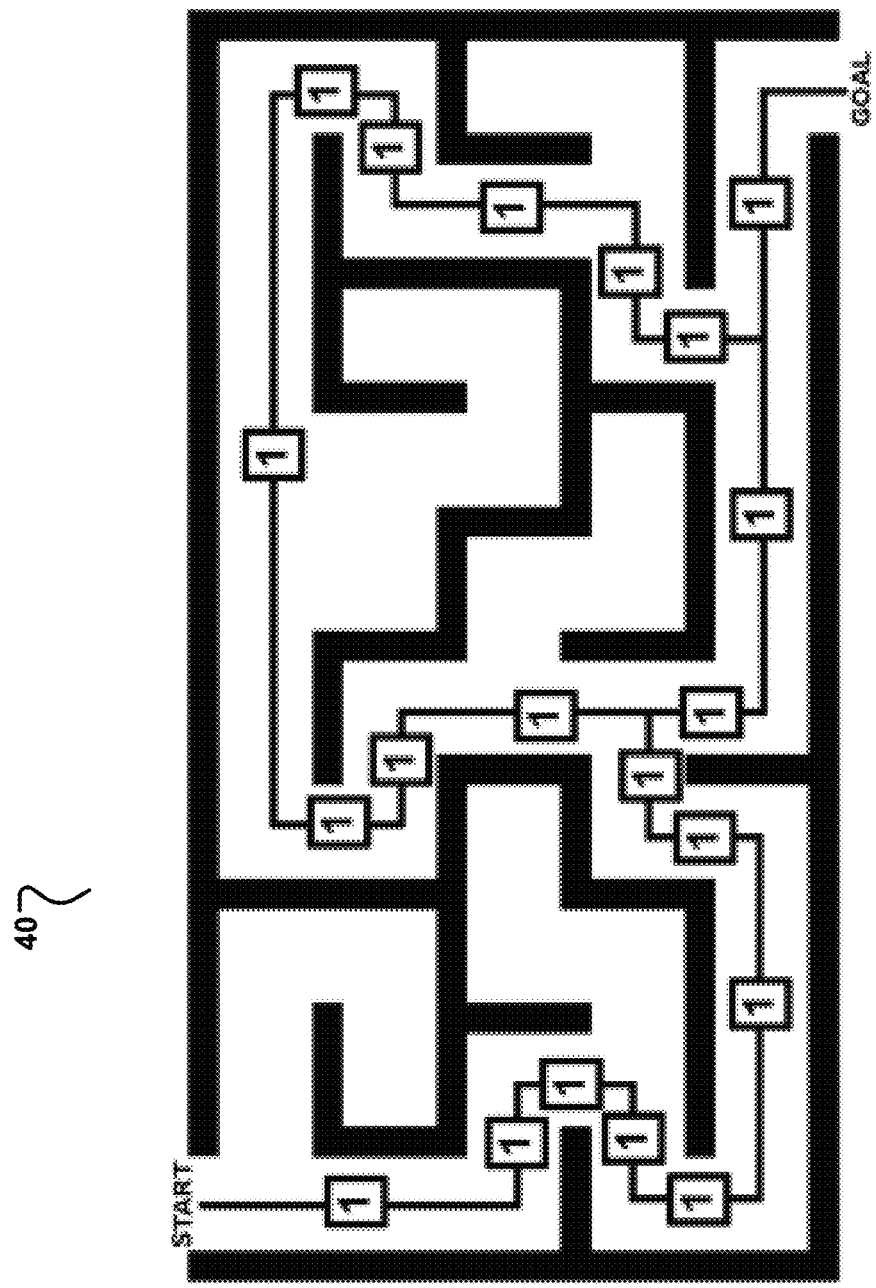
FIG. 4 is a top view of an example cost map.

FIG. 4 shows an example of a cost map 40. In cost map 40, there are no objects in the path of a robot. Accordingly, costs—in this example, weights—associated with segments of routes are all labeled "1". In this example, each segment is a straight line connecting two additional segments. In some examples, greater costs are indicative of less desirable segments. In the example of FIG. 4, the cost of a route may be determined by adding the weights of segments along a route. The greater the cost, the less desirable the route may be. Although weights are described herein in the context of objects, weights may be added to routes based on other factors, such as their length, their difficulty to traverse, their width, and so forth.

Figure 5:
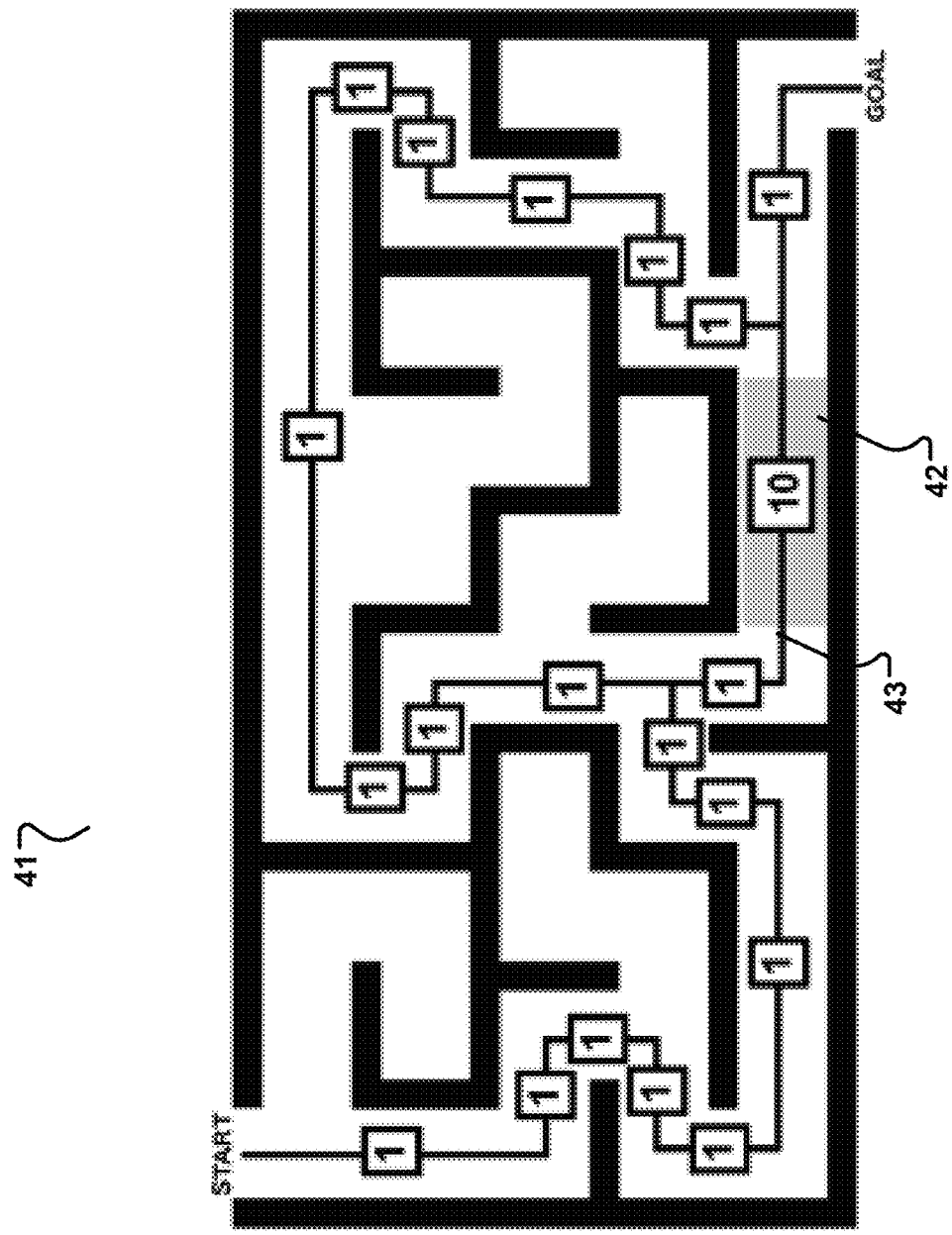
FIG. 5 is a top view of an example cost map having a weight adjusted.

FIG. 5 shows an example of a cost map 41 having a weight on a segment 42 of route 43 adjusted. In this example, the weight is increased to "10". This may indicate the presence of an object in that route. The increase in cost along route 43 containing segment 42 may make that route less desirable and therefore less likely to be selected by a control system when planning robot movement between "start" and "goal".

In some implementations, each mobile robot may include a transmitter and receiver pair, such as a transceiver. In some implementations, each mounted detector may include a transmitter and receiver pair, such as a transceiver. A transmitter/receiver pair on a robot is referred to as a robot pair and a transmitter/receiver pair on a mounted detector is referred to as a remote pair. The robot pairs and remote pairs may be configured to transmit, to receive, or to transmit and to receive information from detectors in the space. For example, the robot pairs and the remote pairs may transmit visual data to the control system for processing. The control system may then transmit information that is based on that processing to a mobile robot. If the control system is resident on the robot, the route may be selected on the robot itself and no information identifying the route need be transmitted.

In some implementations, remote pairs are part of a network communications system or module. In some implementations, each detector includes one or more processing devices. These processing devices in the detector may be used to identify an object using any of the techniques described herein and to output, via the remote pair, information about the detected object to the control system or to a robot directly.

As noted, each robot may store its own copy of a cost map locally. The information from the detectors may be used to adjust costs on routes in that cost map. A controller on the robot may then select the route having the least cost. In some implementations, the control system may transmit, to the robot, updates to the cost map, an entire new cost map containing updates, or information identifying a selected route independent of the cost map. A controller on the robot may receive that information via its robot pair and use that information to update the cost map and/or to control its movement along the selected route.

In some examples, the control system may include on-board circuitry, an on-board computing system, or an on-board controller to implement route planning and to control other operations of the robot. The circuitry, controller or computing system may be "on-board" in the sense that all or part of these components is located on the robot itself. The on-board components may include, for example, one or more processing devices such as one or more microcontrollers, one or more microprocessors, programmable logic such as a field-programmable gate array (FPGA), one or more application-specific integrated circuits (ASICs), solid state circuitry, or any appropriate combination of two or more of these types of processing devices.

In some implementations, on-board components of the control system may communicate with a remote computing system. Components of the remote computing system may be distributed, for example, among the detectors. The computing system is remote in the sense that it is not located on the robot itself. For example, commands provide by the remote computing system may be transferred for execution by on-board components. In some implementations, the control system includes only on-board components. In some implementations, the control system includes a combination of on-board components and the remote computing system. In some implementations, the control system may be configured—for example programmed—to implement control functions, including route planning, absent either local or remote input from a user. In some implementations, the control system may be configured to implement control functions, including route planning, based at least in part on input from a user.

The control system may include of one or more processing devices that are configured—for example, programmed—to obtain information about areas or zones, including possible routes along which a robot may travel. As noted, the control system may be located on the robot itself, distributed across various locations or devices, or located remotely from the robot at a stationary location. For example, the control system may be implemented using one or more processing devices on the robot. For example, the control system may be implemented using one or more processing devices on the robot and on one or more other robots that are traveling or have traveled in the same space as the robot. For example, the control system may be implemented using one or more processing devices at a stationary location separate from all robots in the space. For example, the control system may be implemented using one or more processing devices that are on the robot, on one or more other robots, and/or at the stationary location. The control system may be configured to analyze all or some possible routes that the robot may take between two locations and to select a route that is appropriate under the circumstances. For example, the control system may select a route having the least cost. The control system may then control the robot to move along the selected route. As described below, the control system may also predict an event or developments in an event and control route planning based on the prediction.

In an example, the control system includes a computerized fleet management system configured to control one or more mobile robots and to implement route planning for the robots. The fleet management system and each of the mobile robots may include a copy of, or have access to, the same cost map stored in a memory. The fleet management system is configured to receive updated information about the actual position and operational status of each robot in a fleet of robots and to receive prioritized operation and transport requests from a user. The fleet management system may be configured to perform global route planning for the entire fleet and to send driving or operational instructions to all or some mobile robots within the fleet.

The local planning system may, in some examples, rely on more complete or up-to-date information to make planning decisions than the global or fleet planning systems. Accordingly, the local planning system may take precedence over the global planning system when implementing route planning. This may be primarily for safety reasons, since the global planning system may rely on structural information such as a building's layout, whereas the local planning system has access to up-to-date information about the robots' surroundings using sensors on the robot itself.

In some cases routes may be temporarily occupied by other mobile robots, other vehicles, people, or static objects. In order to reduce the likelihood of an object blocking the robot, the cost map can include information containing driving constraints, such as a width of a doorway, a gate, or a pathway. The fleet planning system can be configured to plan and to schedule individual routes of each mobile robot within the fleet in a way that avoids or at least reduces the chances that the two mobile robots in the same fleet have to pass each other along passages that may be too narrow to accommodate both robots—for example, side-by-side. This may be implemented using visual data from detectors in the robot vision systems described previously.

In some implementations, detectors such as cameras store their coordinates at times within the confined space and are configured to detect the presence of one or more objects within an area of that space. The coordinates of each detector are obtained either by manual input, by relying on sensors designated for obtaining the coordinates, or by accessing sensors installed for localization purposes. Localization includes a process that a robot uses to detect its location in the space. The detectors can also obtain information representing the approximate size, shape, speed, and direction of movement of detected objects, including the robot. This information can be obtained, for example, by comparing overlapping image data from multiple cameras, by performing homographic transformations using camera image data and a reference object, or by comparing a single camera's image data with one or more other sensors' image data, such as outputs of distance measurement sensors or inertial motion units.

The information obtained from the detectors—such as cameras, scanners, or both cameras and scanners—may be provided as input to the control system. The control system is configured to compare the obtained information with characteristic information stored in memory and thereby classify a type of object that has been identified by the detector. This classification can include identifying a type of the object, such as whether the object is a person, a robot, an animal, or the like. In some examples, the classification can be simply that the object is a static object that does not move or a dynamic object that is capable of movement or that is currently moving.

The control system is configured to use information about the object obtained by the control system to estimate the most likely time the object will be present in a planned route of the mobile robot. For example, the same object may be observed multiple times along a route of a cost map and an average speed of the object may be determined. That information may be used to predict a future location of the object.

Information about which parts of the space are likely to be occupied and the time that those areas are likely to be occupied is used to dynamically adjust a cost map of the space stored, in an example, in a memory accessible to the control system. The adjustments to the cost map can include changing the costs (for example, weights) of routes having nodes and edges initially defined by a location's physical characteristics (such as distances, inclinations, type of ground, route or passage width, and the like) and by user settings (such as preferred paths or restricted areas). This cost map is available to each robot and is usable by each robot to implement route planning—for example, to plan a best route from a current position to a destination by selecting edges or routes from the cost map having the least cost. This cost associated with a particular route through the cost map is thus affected by both the initial parameters used to define the cost map and by dynamic adjustments to the cost map generated using input from this static and dynamic detectors, such as those in the vision system. In some implementations, greater costs or some other metric associate with cost may be indicative of a preferred route, in which case the robot may be configured to select the preferred route based on values of the relevant metric or metrics.

Figure 6:
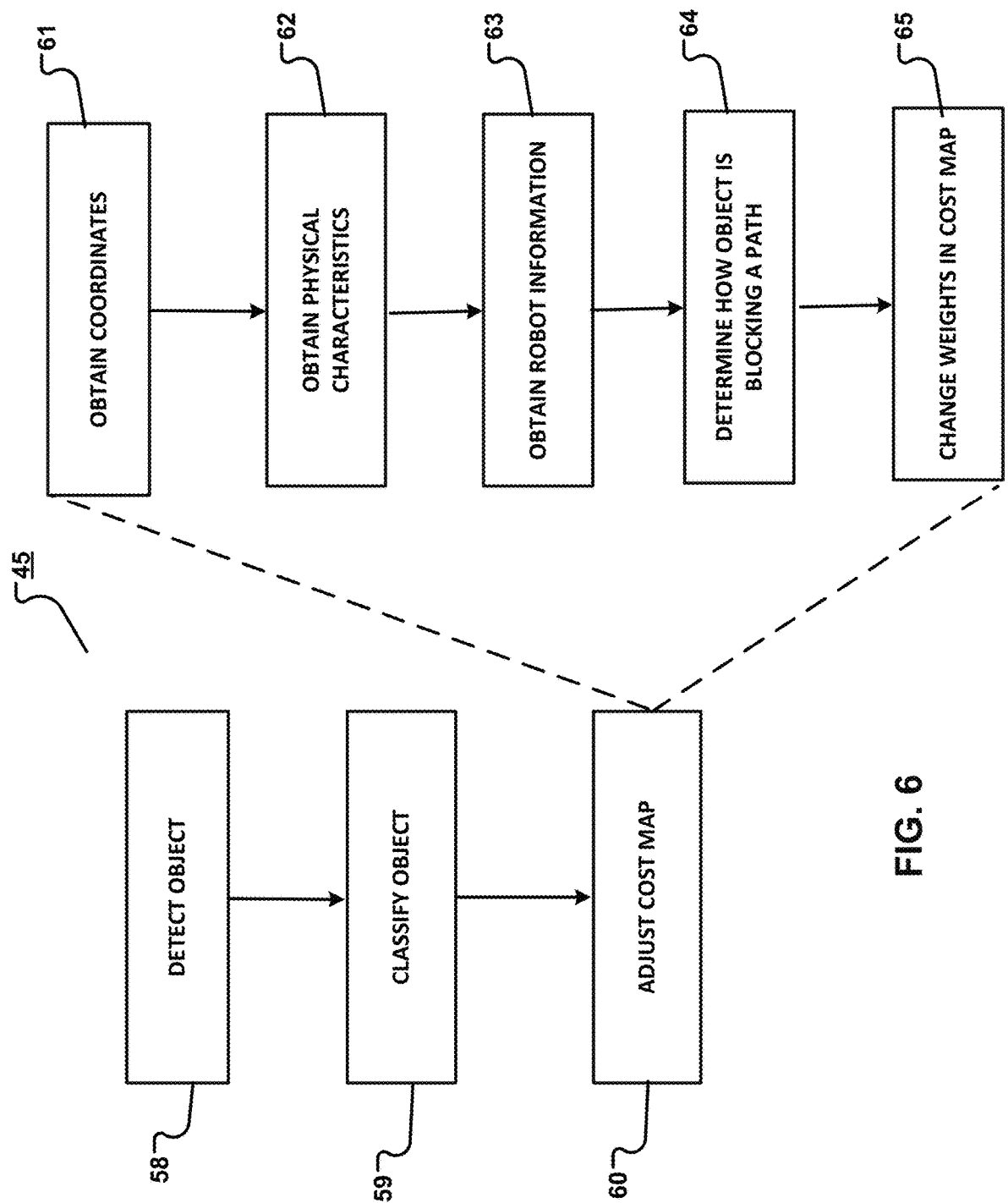
FIG. 6 is a flowchart showing an example process that is part of a route planning process and that includes adjusting a cost map.

FIG. 6 shows an example process 45 for performing route planning using a robot, such as the robot of FIGS. 1 to 3. Process 45 may be performed by the control system which, as noted, may be on the robot only, may be on a stationary computing system only, may be distributed across multiple robots only, or may be distributed across a combination of multiple robots and the stationary computing system.

Figure 7:
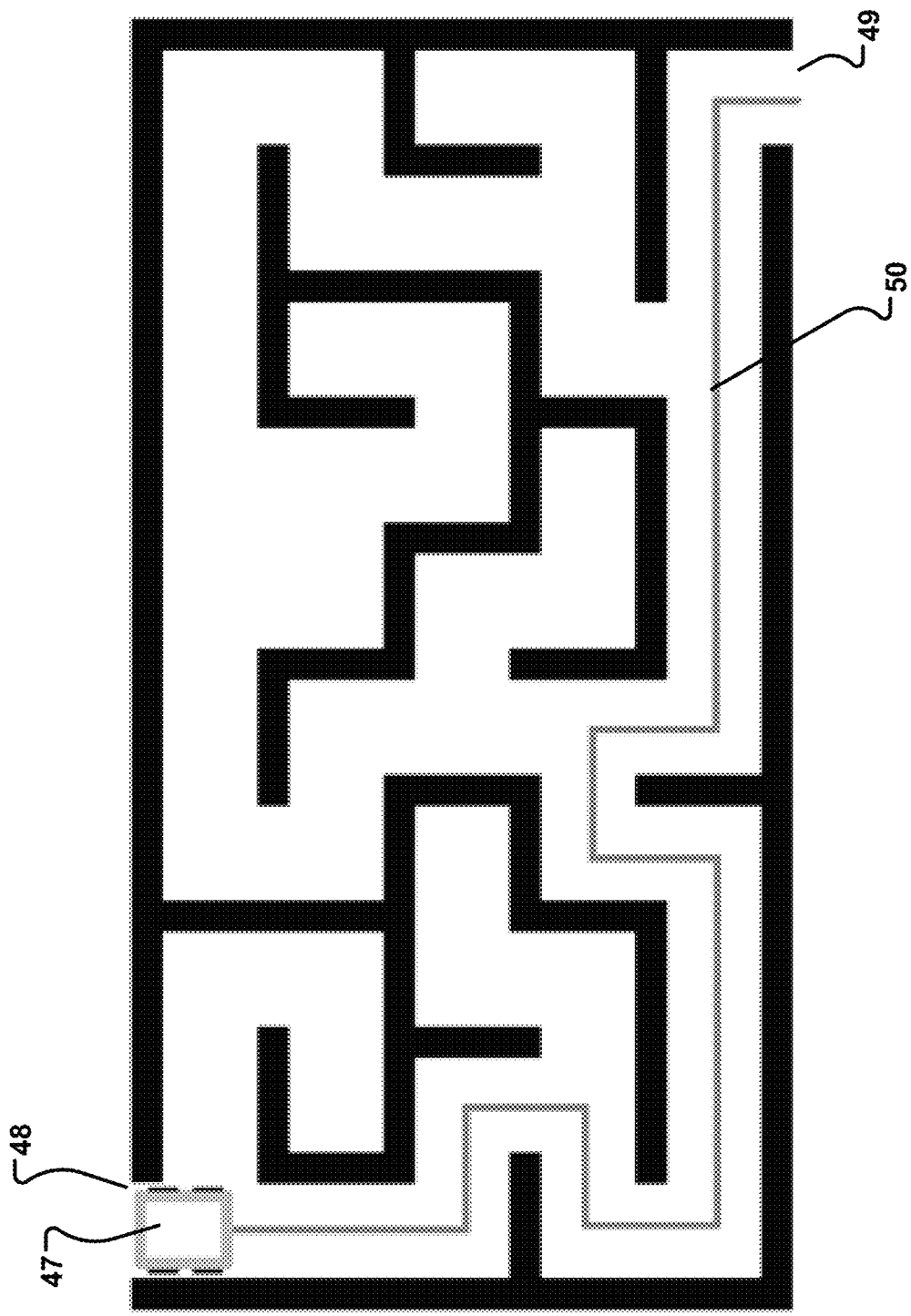
FIG. 7 is a top view of an example map showing a route.
Figure 8:
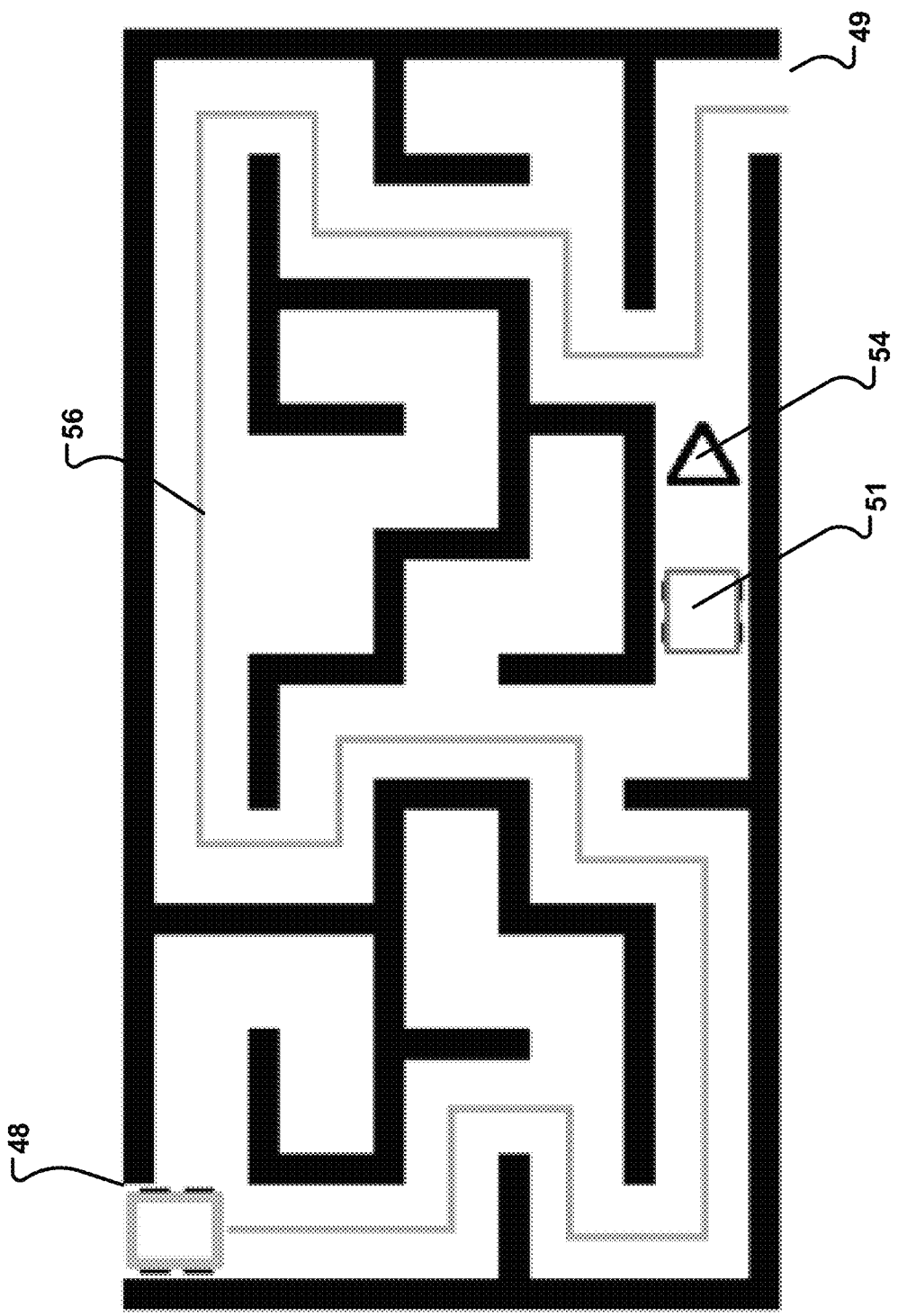
FIG. 8 is a top view of an example map showing an alternative route to be taken in the event that a segment of the route of FIG. 7 is blocked.
Figure 9:
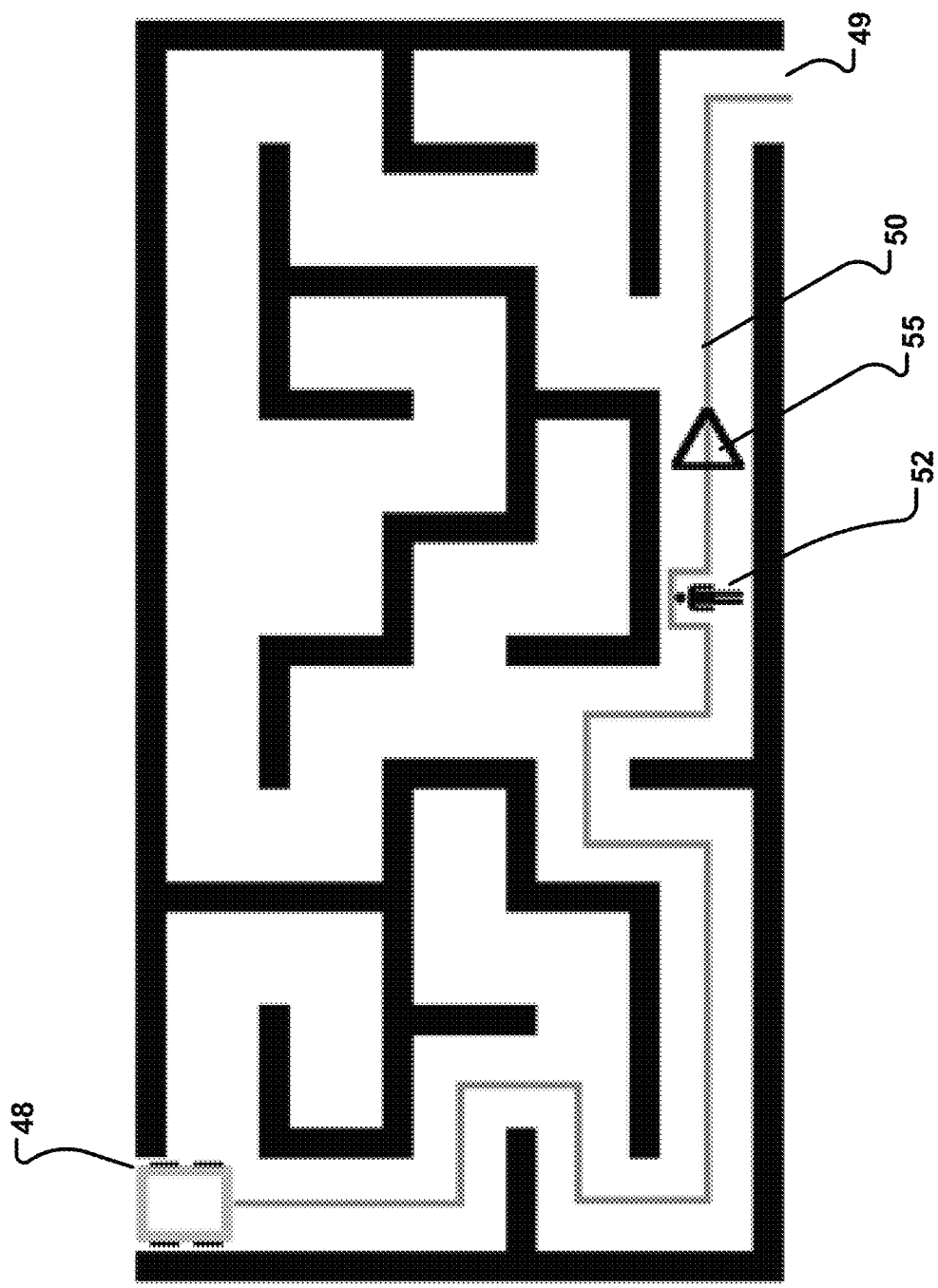
FIG. 9 is a top view of an example map showing an a route around an object that blocks a segment of the route of FIG. 7.

Referring to FIG. 7, in process 45, a robot 47 has performed route planning to move from a first location 48 to a second location 49 along route 50. Process 45 may be used to detect an object 51 (a robot) in FIG. 8 or an object 52 (a person) in FIG. 9 along that route. Detection may be performed by cameras 54 and 55 in FIGS. 8 and 9, respectively. If the robot cannot move around the object as shown in FIG. 8, the robot selects a new route 56 to the second location 49 based on a cost map of the space. If the robot can move around the object as shown in FIG. 9, the robot may still selects the original route to second location 49 based on a cost map of the space and may be controlled to move around the object as illustrated in FIG. 9.

Process 45 includes detecting (58) an object in a space to be traversed by a robot. Detecting the object may be performed by detectors on one or more of: the robot itself, other robots, and mounted along a possible route. Information about the object may be transmitted to the control system by a robot pair or remote pair associated with the detector(s), as described previously.

Detecting the object may include detecting one or more characteristics of the object. Example characteristics include features that are attributable to a particular type or class of object. For example, the detectors may be configured to detect one or more characteristics indicating that the object is an animate object, such as a human or an animal. For example, the detectors may be configured to detect one or more characteristics indicating that the object is a known object, such as a robot that is capable of communicating with a camera. For example, the detectors may be configured to detect one or more characteristics indicating that the object is an unknown dynamic object, such as a robot that is not capable of communicating with a camera. For example, the detectors may be configured to detect one or more characteristics indicating that the object is a static object, such as a structure that is immobile. The characteristics represented by the data may be compared against information—which may include a library of characteristics for different classes—stored in computer memory in order to identify a class of the object in the route.

After an object has been detected, the object is classified (59). To classify the object, the control system analyzes attributes of the object. In this regard, signals from the detectors or data based on those signals may also represent attributes of the object. Attributes of the object include, but are not limited to, features or characteristics of the object or its surroundings. For example, attributes of an object may include, but are not limited to, its size, color, structure, shape, weight, mass, density, location, environment, chemical composition, temperature, scent, gaseous emissions, opacity, reflectivity, radioactivity, manufacturer, distributor, place of origin, functionality, communication protocol(s) supported, electronic signature, radio frequency identifier (RFID), compatibility with other devices, ability to exchange communications with other devices, mobility, and markings such as bar codes, quick response (QR) codes, and instance-specific markings such as scratches or other damage. Appropriate detectors may be incorporated into the camera to detect any one or more of the foregoing attributes and to output signals representing one or more attributes detected.

In some implementations, the attributes may be provided from other sources, which may include an on-board detector or an external detector, such as a detector mounted to a wall. For example, external environmental motion detectors, temperature detectors, gas detectors, or the like may provide attributes of the object. These detectors may communicate with the control system. For example, upon encountering an object, the control system may communicate with one or more environmental detectors to obtain attributes corresponding to the geographic coordinates of the object. For example, upon a detector such as a camera encountering an object, the control system may communicate with one or more environmental detectors to obtain attributes corresponding to the geographic coordinates of the object.

Analyzing attributes of the object ("the object attributes") may include comparing the object attributes to a library of stored attributes ("the stored attributes"). The library may be stored in computer memory. For example, the library may include one or more look-up tables (LUTs) or other appropriate data structures that are used to implement the comparison. For example, the library and rules may be stored in the form of a machine leaning model such as, but not limited to, fuzzy logic, a neural network, or deep learning. The stored attributes may include attributes for different classes of objects, such as animate objects, static objects, known objects, or unknown dynamic objects. The object attributes are compared to the stored attributes for different classes of objects. The stored attributes that most closely match the object attributes indicate the class of the object. In some implementations, a match may require an exact match between some set of stored attributes and object attributes. In some implementations, a match may be sufficient if the object attributes are within a predefined range of the stored attributes. For example, object attributes and stored attributes may be assigned numerical values. A match may be declared between the object attributes and the stored attributes if the numerical values match identically or if the numerical values are within a certain percentage of each other. For example, a match may be declared if the numerical values for the object's attributes deviate from the stored attributes by no more than 1%, 2%, 3%, 4%, 5% or 10%, for example. In some implementations, a match may be declared if a number or recognized features are present. For example, there may be a match if three or four out of five recognizable features are present.

In some implementations, the attributes may be weighted based on factors such as importance. For example, shape may be weighted more than other attributes, such as color. So, when comparing the object attributes to the stored attributes, shape may have a greater impact on the outcome of the comparison than color.

After the object has been identified, process 45 adjusts (60) the cost map for space in which the robot is traveling. To adjust the cost map, process 45 may obtain (61) the coordinates of the detector that detected the object. Process 45 may obtain (62) the physical characteristics of the space at the location of the object. For example, process 45 may obtain a width of the path where the object is located, an inclination of the path, and a type of material of which the path is made. Process 45 also obtains (63)—for example, from memory—information about that dimensions of the robot. Based on the coordinates, the physical characteristics of the space, the dimensions of the robot, and the attributes of the object, process 45 may determine (64) how the path is blocked if at all—for example, whether the object is completely or partially blocking the path. Process 45 may then adjust the cost map accordingly. For example, weights along routes of the cost map may be changed (65). For example, if it is determined that the object is partially blocking the path and that the robot can move around the object, the cost of the path may be increased—for example, weighted—less than if the object is completely blocking the path or blocking the path such that the robot cannot move around the object. As noted, FIG. 5 shows an example of a cost map that has been adjusted along segment 42. A route is then selected based on the adjusted cost map.

In some implementations, information for the cost map can be transferred to a single robot or to multiple—for example, all—robots operating in a space defined by the cost map and controlled by the control system. Accordingly, the behavior dictated by the cost map may, in some examples, apply to multiple robots in the space. For example, each robot may be controlled to take a route that avoids a same object.

In some implementations, a robot may implement different behaviors for different types of objects. Example behaviors include, but are not limited to, selecting a new route, moving around an object in a path, or waiting for a time for the object to move out of the path before proceeding along the path. A behavior for a particular type of object may be learned using artificial intelligence, such as machine-learning based techniques, or may be obtained from user input. Different types of behaviors can also be implemented based on whether the system detected a known or unknown object. For example, in some implementations, the control system may adjust the cost map when a specific type of object is detected but not when other types of objects are detected. For example, the control system may be configured to prevent vehicles from the same manufacturer as a camera system from accessing a specific location when vehicles from another manufacturer are detected within that location but not when other vehicles from the same manufacturer are detected within that location.

In some implementations, instead of adjusting a cost map, the control system can send a command to all or some robots within an area where a known or unknown object was detected. The command may instruct one or more of the robots to exit the area immediately as part of an emergency maneuver. This command can also be sent directly from the control system to all or some of the robots.

In some implementations, different types of robot behaviors or actions can have different levels of aggression. A level of aggression indicates how forceful the robot is in implementing a behavior or taking an action. For example, detection of a person can trigger actions having different levels of aggression, which may be based on how that person is to interacting with robot. When, for example, the system is deployed in a factory where workers and robots interact on a regular basis, the robot may not change its route upon encountering a person. By contrast, in a more sensitive location such as a hospital, where new people can come and go every day, many of whom are not used to interacting with a robot, the robot may follow a more conservative approach and slow down or even stop upon detecting a person in its path.

In some implementations, the speed and direction of movement of a robot and/or object may be estimated or predicted. Example factors that may be used to predict movement include, but are not limited to, a sequence of observations of a specific object class and knowledge about the current location of a detector and the space. For example, by observing a specific object class taking a certain amount of time to cross a detector's field of view, and by knowing the physical distance that the detectors' field of view covers and the location of the detector, the speed of this moving object can be estimated. Based on this information, a prediction about the movement of the robot can be made. This prediction may be useful when an object or the robot is not in the field of view of a detector—for example, the object is in a blind spot in the space. For example, if an object and the robot are predicted to meet along a route, the cost of that route may be increased prior to the robot moving along that route. As such, the object can be avoided by causing the robot to take a different route if necessary. Thus, further developments of an event, such as movement of an object or robot, may be predicted and used to control movement of the robot based on the cost map. In some implementations, detectors on the robot itself may alleviate the effects of blind spots on mounted detectors, since the detectors on the robots may provide coverage for blind spots. For example, since the detectors move with the robot, the detectors may reduce the occurrence of blind spots resulting from stationary detectors.

In some implementations, the cost of a route in the cost map may be based on an estimated duration that the route will be blocked by an object and the estimated time for the robot to meet the object in the route. For example, a vehicle may be known to follow a route consistently and to obstruct a narrow passage. This known route can be used to estimate for how long the narrow passage will be blocked and therefore influence movement of the robot through changes in the cost of the route on the cost map. Furthermore, a robot heading to that passage having an estimated travel time longer than the expected blockage will not be affected by the blockage. That is, knowing these factors, the control system will not change the cost map for the robot to increase the cost of traveling along that route. In another example, a robot heading to that passage that has alternative routes that will take longer than waiting for the expected blockage to clear will also not be affected. This is because the cost of the alternative routes will still be more than the cost of the current route.

In some implementations, when a moving object detected in a potentially problematic location is moving in a direction that will not cause it to intersect a route of a robot, the robot will not be affected. For example, the cost map of the robot may not be changed or may be changed in such a way that the robot's route does not change. Furthermore, by taking into account detector parameters, such as a tilting angle of a camera and its mounting location height, a displacement of a known object in consecutive camera captures can be used to infer an object's movement direction. For example, if the moving object is detected in a narrow passage but in the same movement direction as the robot and moving ahead of the robot with at least the same speed as the robot, the robot will not be affected since, when the robot arrives in the location where the object was detected, the passage will no longer be blocked. In this example, the cost map may not be changed or may be changed in such a way that it does not affect movement of the robot along its current route.

In some implementations, detectors deployed at locations inside a building communicate with the control system, which may include a centralized control system, components on individual robots, or both. In some implementations, these detectors may include cameras that are configured to enable detection—for example, vision—from different perspectives of the same location, allowing homographic transformations of the observed scene and allowing spatial mapping of detected objects, including relatively accurate speed and movement detection estimation.

Figure 10:
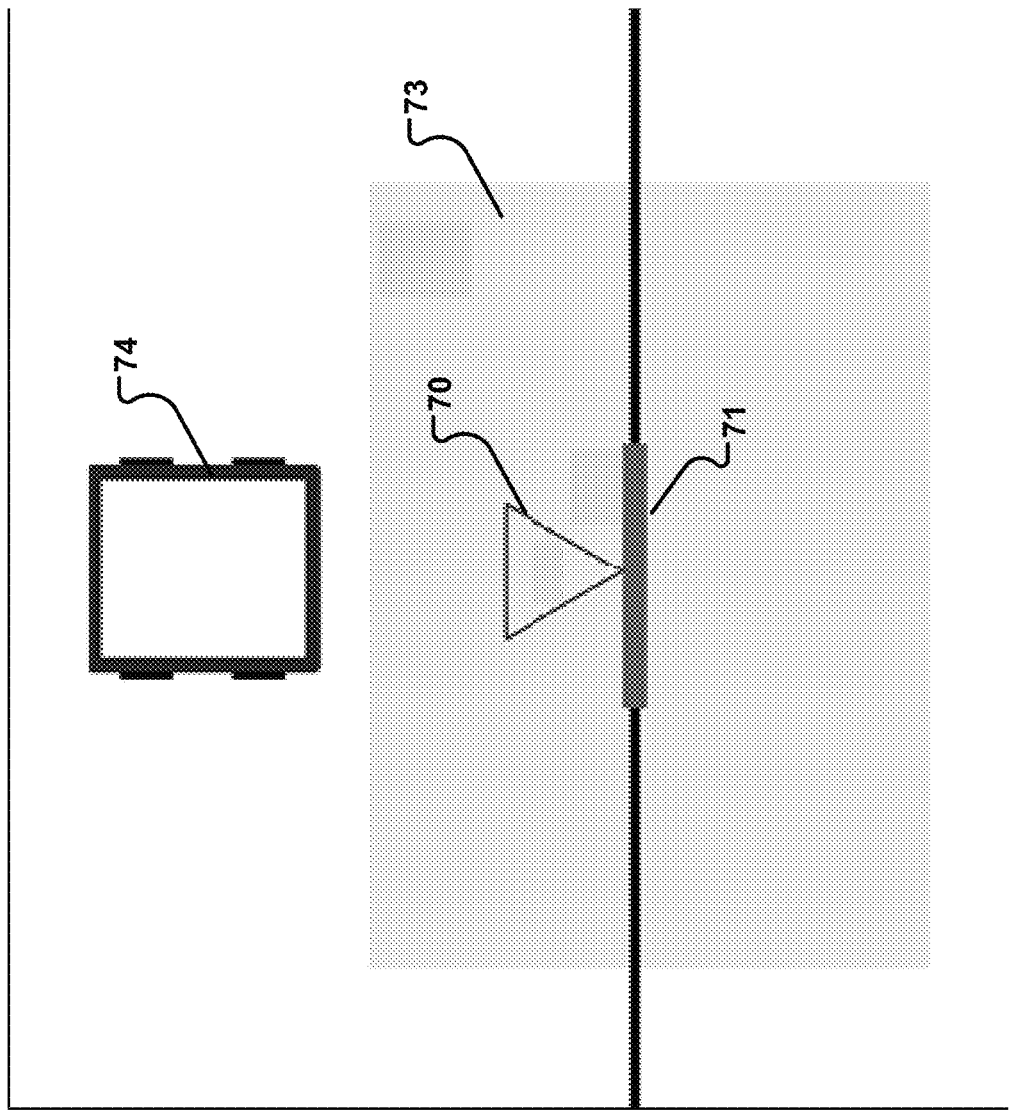
FIG. 10 is a top view of a detector in a zone around a door opening.

In some implementations, detectors such as cameras are deployed at zones inside a building that re potential logistic bottlenecks. For example, in FIG. 10, a camera 70 is mounted near doorway 71 to detect objects in a field of view 73 that robot 74 can move around or objects that the robot cannot move around. The detectors are configured to communicate with the control system. In some implementations, the detectors include one or more processing devices to execute computer vision processes trained to detect a set of object classes (known to exist in the current location), their movement direction, their movement speed, and their observation frequency, and to report this information to the control system. The control system is configured to use this information to make the decisions regarding route planning. In some implementations, the control system dynamically adjusts cost maps that are used to decide which route a robot or robots are to take. By changing the cost of a specific route in the cost map, a longer but unobstructed path can become more favorable.

In some implementations, deployed static detectors such as cameras can be configured to send a command to block an entire zone of a cost map when a specific object is detected, preventing all incoming movement to that zone and either fully stopping or commanding robots inside that zone to exit that zone immediately. In some implementations, when a person is detected inside a zone meant solely for robots, a static camera that detected the person can send an emergency command to the control system to stop movement of all robots in the zone. In another example, a specific zone of a building may become unsuitable for autonomous ground vehicles when a specific type of object is detected. For example, a large and difficult-to-maneuver, human-driven vehicle may need the entirety of a zone to operate, making this zone unsuitable for robots to operate there at the same time as the vehicle. To automate this process, the control system may prevent robots from entering this zone while the human-driven vehicle is operating there or heading in its direction. For example, the control system may update a cost map of that zone to include a weight that precludes robots from selecting a route through that zone and thus moving through that zone.

In some implementations, the control system may be configured to process commands from an external source, such as an actuator or an enterprise resource planning (ERP) system. In some implementations, the control system, the robots, and the detectors may communicate over a wireless communication system, such as Local Area Network (LAN) having Wi-Fi, ZigBee, or Z-wave. Other networks that may also be used for communication between the control system, the robots, and the detectors include, but are not limited to, LoRa, NB-loT (NarrowBand Internet of Things), and LTE (Long Term Evolution). The control system may include application programmable Interface (API) through which other systems can interact with the control system.

Figure 11:
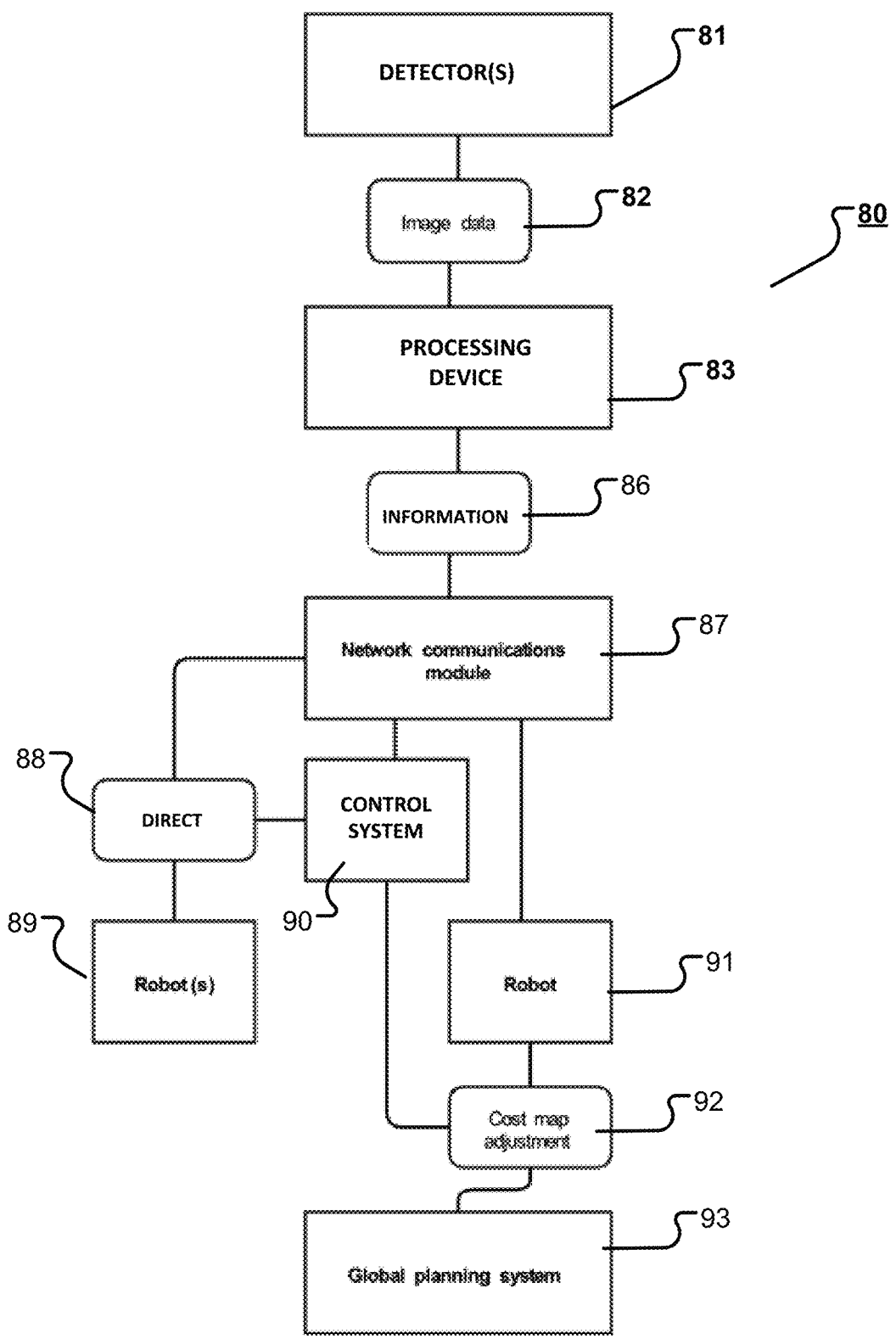
FIG. 11 is a block diagram of an example system configured to perform route planning based on inputs from one or more detectors.

FIG. 11 shows a block diagram 10 containing components of an example system for performing route planning in the manner described herein. Block diagram 80 includes one or more detectors 81, such as a camera, configured to output image data 82 to a processing device 83. The processing device in this example may be a local processing device that is included in—for example, part of—a detector or that communicates with the detector. The processing device outputs information 86 identifying objects in a route that a robot is to take between two locations. The information 86 is transmitted to a network communications module 87 in this example. The network communications module 87 may be included in the detector or may be in communication with the detector. The network communication module may include the remote pair described previously. The network communications module may send the information directly 88 to control one or more robots 89 or to the control system 90 (in this example, a fleet management system) or directly to another robot 91 to adjust a cost map 92 based on the information. The cost map may be part of a global planning system 93 that distributes the cost map to one or more robots controlled thereby.

The example robots and systems described herein may include, and the processes described herein may be implemented using, a control system comprised of one or more computer systems comprising hardware or a combination of hardware and software. For example, a robot, the control system, or both may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example robots and systems described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the robot can be performed by one or more programmable processors executing one or more computer programs to perform the functions described herein. At least part of the robot can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

In the description provided herein, the adjectives "first", "second", "third", and the like do not designate priority or order. Instead, these adjectives are used solely to differentiate the three types of localization systems described herein.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
   a computing system configured to identify an event in an area between a first location and a second location and to adjust, based on the event, content of a cost map containing a representation of one or more routes between the first location and the second location;
   an autonomous device configured to move between the first location and the second location based on the cost map;
   first detectors on a route among the one or more routes that are not movable along a length of the route, the first detectors on the route leaving at least some areas not covered by the first detectors; and one or more second detectors on the autonomous device or on another autonomous device, the one or more second detectors being configured to perform detection in the at least some areas not covered by the first detectors on the route;

wherein at least one of the first detectors on the route or the one or more second detectors are configured to send data to the computing system representing the event.

2. The system of claim 1, wherein the computing system is configured to identify the event based on the data.

3. The system of claim 2, wherein the first detectors comprise one or more cameras located in the area.

4. The system of claim 2, further comprising a detection system comprising the first detectors, the detection system comprising cameras that are static and that are along the one or more routes between the first location and the second location.

5. The system of claim 2, further comprising a detection system comprising the first detectors, the detection system comprising cameras that are dynamic and that are along the one or more routes between the first location and the second location.

6. The system of claim 2, wherein the one or more second detectors comprise cameras that are located on the autonomous device.

7. The system of claim 2, wherein the first detectors comprise cameras that are located in the area and the one or more second detectors comprise one or more cameras that are located on another autonomous device.

8. The system of claim 2, wherein the event comprises an obstacle blocking one of the one or more routes at least partly.

9. The system of claim 1, wherein the computing system is separate from the autonomous device.

10. The system of claim 1, wherein the computing system is located on the autonomous device.

11. The system of claim 1, wherein the computing system is distributed, with at least part of the computing system being located on the autonomous device and at least part of the computing system being separate from the autonomous device.

12. The system of claim 1, wherein adjusting the content of the cost map comprises adding a weight to a cost of a route among the one or more routes, with a greater weight being indicative of a less desirable route.

13. The system of claim 1, wherein the one or more routes comprise at least two routes having different costs; and wherein the computing system is configured to select one of the at least two routes for the autonomous device based on a cost of the one of the at least two routes.

14. The system of claim 1, wherein the one or more routes comprise at least two routes having different costs; and wherein the computing system is configured to select one of the at least two routes having a least cost for the autonomous device.

15. The system of claim 1, wherein the one or more routes comprise at least two routes having different costs; and wherein the computing system is configured to select one of the at least two routes for the autonomous device based on a cost of the one of the at least two routes, the cost being based at least in part on one or more of the following: a length of the one of the at least two routes, an inclination of the one of the at least two routes, a material associated with the one of the at least two routes, or a width of the one of the at least two routes.

16. The system of claim 15, wherein greater costs are assigned to longer routes.

17. The system of claim 1, wherein the computing system is configured to predict a further development of the event as part of a process for identifying the event; and wherein the computing system is configured to adjust the content of the cost map based on the further development of the event.

18. The system of claim 1, wherein a route among the one or more routes comprises a segment along a path between the first location and the second location, the segment containing an entirety of the path between two locations on the path.

19. The system of claim 1, wherein a route among the one or more routes comprises a zone along a path between the first location and the second location, the zone containing less than an entirety of the path between two locations on the path.

20. The system of claim 1, wherein the one or more second detectors are on the autonomous device and are configured to send data based on the event to the computing system;

wherein the computing system is configured to adjust the content of the cost map based on the data to produce an adjusted cost map; and wherein the computing system is configured to transmit the adjusted cost map to one or more other autonomous devices.

21. The system of claim 1, wherein identifying the event comprises predicting the event.

22. The system of claim 1, wherein the event comprises an object blocking the route; and wherein identifying the event comprises predicting that the object that will block the route based on one or more attributes of the object.

23. The system of claim 22, wherein the one or more attributes of the object comprises a size of the object, a color of the object, or a shape of the object.

24. The system of claim 22, wherein the one or attributes of the object comprise one or more of a speed of movement of the object, a direction of movement of the object, or a location of the object.

25. A system comprising:

a computing system configured to identify an event in an area between a first location and a second location and to adjust, based on the event, content of a cost map containing a representation of one or more routes between the first location and the second location wherein identifying the event comprises predicting the event;

an autonomous device configured to move between the first location and the second location based on the cost map;

detectors on a route among the one or more routes that are not movable along a length of the route, the detectors on the route leaving areas not covered by the detectors;

wherein predicting the event comprises predicting whether an object will at least partly block at least one of the areas not covered by the detectors.

26. The system of claim 25, wherein the event is a temporary event.

27. A method comprising:

detecting an event in a route between a first location and a second location;

identifying the event based on data representing the event;

adjusting content of a cost map containing a representation of the route based on identification of the event;

making the cost map accessible to an autonomous device that is capable of traversing the route; and controlling the autonomous device to traverse the route based on the cost map;
wherein detecting is performed using:
first detectors on the route that are not movable along a length of the route, the first detectors on the route leaving at least some areas not covered by the first detectors; and
one or more second detectors on the autonomous device configured to perform detection in the at least some areas not covered by the first detectors.

28. The method of claim 27, wherein adjusting the content of the cost map comprises adding a cost to the route, with a greater cost being indicative of a less desirable route.

29. The method of claim 27, wherein routes, including the route, between the first location and the second location on the cost map have different costs; and
wherein controlling the autonomous device to traverse the route comprises selecting the route based on a cost of the route.

30. The method of claim 27, wherein the route comprises a segment along a path between the first location and the second location, the segment containing an entirety of the path between two locations on the path.

31. The method of claim 27, wherein the route comprises a zone along a path between the first location and the second location, the zone containing less than an entirety of the path between two locations on the path.

32. The method of claim 27, wherein detecting is performed by the one or more second detectors on the autonomous device; and
wherein making the cost map accessible comprises distributing the cost map to one or more autonomous device including the autonomous device.

33. The method of claim 27, wherein detecting is performed by one or more cameras located along the route, the one or more cameras being part of the first detectors; and
wherein identifying is performed by a computing system that is separate from the autonomous device.

34. The method of claim 27, wherein detecting is performed by one or more cameras located along the route, the one or more cameras being part of the first detectors; and
wherein identifying is performed by a computing system that is part of the autonomous device.

35. The method of claim 27, wherein detecting is performed by one or more cameras located along the route, the one or more cameras being part of the first detectors; and
wherein identifying is performed by a computing system that is partly on the autonomous device and partly separate from the computing device.

36. The method of claim 27, wherein identifying the event comprises predicting a further development of the event.

37. The method of claim 36, wherein the event comprises an object blocking the route; and
wherein identifying the event comprises predicting that the object that will block the route based on one or more attributes of the object.

38. The method of claim 37, wherein the one or more attributes of the object comprises a size of the object, a color of the object, or a shape of the object.

39. The method of claim 37, wherein the one or attributes of the object comprise one or more of a speed of movement of the object, a direction of movement of the object, and a location of the object.

40. A method comprising:
detecting an event in a route between a first location and a second location;
identifying the event based on data representing the event, where identifying the event comprises predicting a further development of the event;
adjusting content of a cost map containing a representation of the route based on identification of the event;
making the cost map accessible to an autonomous device that is capable of traversing the route; and
controlling the autonomous device to traverse the route based on the cost map;
wherein there are detectors on the route that are not movable along a length of the route, the detectors on the route leaving areas not covered by the detectors; and
wherein predicting the event comprises determining whether an object will at least partly block at least one of the areas not covered by the detectors.

41. The method of claim 40, wherein the event is a temporary event.

42. The system of claim 1, wherein a first detector among the first detectors is mounted on a structure and is movable pivotally, rotatably, or translationally relative to the structure.

43. The system of claim 25, wherein a detector among the detectors is mounted on a structure and is movable pivotally, rotatably, or translationally relative to the structure.

44. The method of claim 39, wherein a first detector among the first detectors is mounted on a structure and is movable pivotally, rotatably, or translationally relative to the structure.

45. The method of claim 40, wherein a detector among the detectors is mounted on a structure and is movable pivotally, rotatably, or translationally relative to the structure.

* * * * *